United States Patent [19]

Nettel

[11] Patent Number: 4,701,089
[45] Date of Patent: Oct. 20, 1987

[54] QUICK RELEASE COVER
[75] Inventor: Hans Nettel, Oceanside, Calif.
[73] Assignee: Tom-Kap-Co, San Diego, Calif.
[21] Appl. No.: 872,702
[22] Filed: Jun. 10, 1986

Related U.S. Application Data

[63] Continuation-in-part of Ser. No. 661,980, Oct. 18, 1984.

[51] Int. Cl.[4] .......................... F16B 19/00; F16B 33/00
[52] U.S. Cl. ..................................... 411/373; 411/404; 411/431
[58] Field of Search ............... 411/371, 372, 373, 374, 411/375, 376, 377, 403, 404, 410, 910, 411, 431; 138/89, 89.4; 220/214, 242, 256, 257

[56] References Cited

U.S. PATENT DOCUMENTS

| D. 136,659 | 11/1943 | Janning et al. ................ 411/410 X |
| 915,068 | 3/1909 | Bowen ............................. 411/372 X |
| 1,446,988 | 2/1923 | Osburn ............................ 411/403 X |
| 1,945,707 | 2/1934 | Sharp ................................. 438/89 X |
| 1,997,203 | 4/1935 | Shera ................................... 220/257 |
| 2,140,449 | 12/1938 | Brown ................................ 411/410 |
| 2,363,665 | 11/1944 | George ............................... 411/373 |
| 2,627,778 | 2/1953 | Hodell ................................ 411/372 |
| 3,888,144 | 6/1975 | Parsons ......................... 411/403 X |
| 4,136,796 | 1/1979 | Pubas et al. ....................... 220/256 |

FOREIGN PATENT DOCUMENTS

| 2826933 | 8/1979 | Fed. Rep. of Germany ...... 411/371 |
| 3113831 | 2/1982 | Fed. Rep. of Germany ...... 411/373 |
| 7907153 | 4/1980 | Netherlands ........................ 411/371 |
| 1150382 | 4/1969 | United Kingdom ................ 411/403 |
| 1324973 | 7/1973 | United Kingdom ................ 411/373 |

Primary Examiner—Neill Wilson
Attorney, Agent, or Firm—Baker, Maxham & Jester

[57] ABSTRACT

A cover for covering closure plugs and openings and the like comprises a generally circular plate with axially positioned and extending latching fingers for engaging the corners of intersecting walls of a tool cross slot upon rotation of the cover for releasably retaining the cover in place over the plug.

14 Claims, 7 Drawing Figures

QUICK RELEASE COVER

This application is a continuation-in-part application of Ser. No. 661,980, filed Oct. 18, 1984.

BACKGROUND OF THE INVENTION

The present invention relates to covers and pertains particularly to covers for receptacle closures, such as plugs and the like.

Closure members, such as plugs that are threadably mounted in an opening, require generally a tool similar to a wrench for rotating the plug for installation and removal. If the plug is flush mounted, it will typically have some form of recess to be engaged by a wrench or wrench-like tool for removal. It is also frequently desirable to cover the closure plug for aesthetic or other purposes.

The plumbing codes of most cities require that cleanout plugs for the sewer system of most buildings be flush with the wall or floor in which it is mounted and that it be covered. Most cleanout plugs installed in recent years are made of plastic and have a plastic cover that is mounted over the plug by means of a screw that threads into a bore in the center of the plug. The screw provided with the plug and cover is a self tapping blunt end screw that extends partially into a cylindrical bore in the center of the plug.

When the standard screw becomes lost or misplaced, the worker usually replaces it with a wood screw, which extends beyond the bottom of the bore and penetrates the cover. This destroys the seal of the closure member and requires the replacement thereof.

It is, therefore, desirable that some mounting means be available that eliminate this problem.

SUMMARY AND OBJECTS OF THE INVENTION

It is the primary object of the present invention to provide an improved cleanout plug and cover.

In accordance with the primary aspect of the present invention, a cleanout plug is provided with a cross slot in the face thereof, and a cover therefor includes a plurality of fingers that extend into the cross slots and engage the corner of the walls of the slot upon rotation thereof for releasably retaining it in place.

BRIEF DESCRIPTION OF THE DRAWINGS

The above and other objects and advantages of the present invention will become apparent from the following description when read in conjunction with the drawings wherein.

DETAILED DESCRIPTION OF A PREFERRED EMBODIMENT

Figure 1:
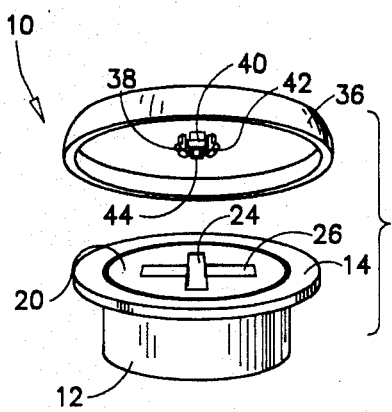
FIG. 1 is a perspective view of a preferred embodiment of the invention.

Referring to FIG. 1 of the drawing, a closure and cover assembly in accordance with the invention is illustrated. The closure assembly comprises a cylindrical sleeve 12 having a generally cylindrical outer surface and a radially extending flange 14 at the upper end thereof. This sleeve, as can best be seen in FIG. 2, includes a central bore 16 having threads 18 near the upper end thereof. The closure assembly is adapted to extend into or be mounted into a receptacle, such as the end of a type of an internal diameter equal to that of the exterior diameter of the sleeve for providing a closure for the end of the pipe. The present invention is designed especially for use as a cleanout opening, as in my prior application. However, the closure may be utilized in any number of other applications, such as for the provision of closures in vessels, tanks and the like. The sleeve is simply inserted and bonded by a suitable high strength adhesive into position in a cylindrical bore of a substantially equal diameter to that of the outer diameter of the sleeve. The radial flange 14 serves to position the sleeve against the receptacle or vessel or the end of the pipe as the case may be.

A special plug 20, having external threads for threadably engaging the internal threads 18 of the sleeve, serves to close the end of the sleeve. The sleeve and plug are preferably constructed such that the threads taper slightly or the bore thereof tapers slightly, such that the plug is seated with the flush upper surface thereof being flush with the surface of the end of the sleeve.

The plug, as illustrated, is provided with a special cross slot for receiving a wrench like tool as will be explained for applying torque thereto for insertion or removing of the plug in place. The cross slot comprises first and second slots 24 and 26, which are preferably identical in length and depth and cross at ninety degrees at the center thereof. The slots are preferably also centered within the center of the circular plug 20. The walls of the slots are vertical and of a common depth, such that they form a plurality of ninety degree edges or corners 28, 30, 32 and 34 at the intersection of the cross slots. These corners serve, as will be explained, for retaining a cover 36 in position.

Figure 2:
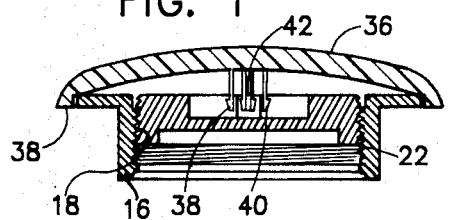
FIG. 2 is a side elevation view in section showing details of the cover retainer.

The cover 36 is of a generally dish like configuration slightly capped or cupped, as will be seen in FIG. 2, and may have downwardly depending skirt portion 38, for example, extending downward to overlap the flange or rim 14 of the sleeve insert of the closure apparatus.

The cover 36 is provided with means for gripping the walls of the cross slot for releasably retaining the cover in position over the closure plug 20. The gripping means, as can be seen in FIG. 1, for example, comprises a plurality of downwardly depending fingers 40, 42, 44, and 46 arranged in an array around the center axis of the cover 36 and extending downward therefrom. These fingers, as can be seen in FIG. 3, extend downward into, when properly aligned, each of the respective slots 24 and 26 and are positioned in a non-engaging or non-retaining position, as shown in FIG. 3, between the walls or resting in the respective slots.

Figure 4:
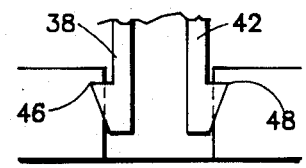
FIG. 4 is an enlarged partial side elevation view showing details of the gripping fingers in the slots.
Figure 5:
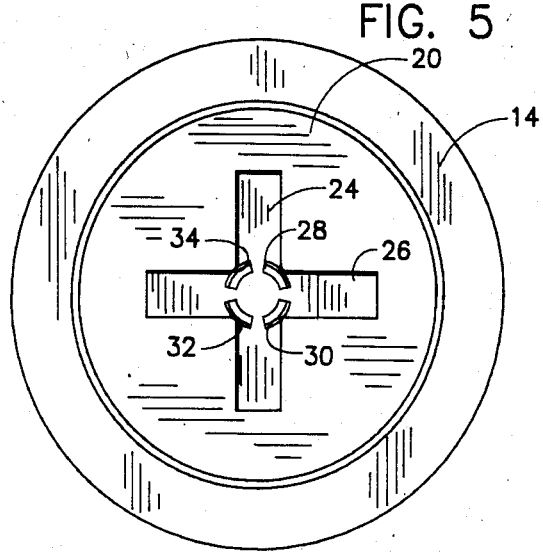
FIG. 5 is a view like FIG. 3 showing the fingers in the gripping position.
Figure 3:
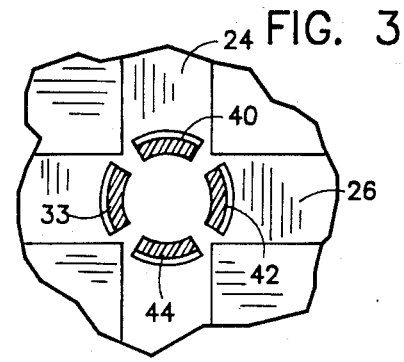
FIG. 3 is a top plan view of the cover showing the gripping fingers in a released position.

The cover can be rotated from its position, as shown in FIG. 3, to a position, as shown in FIG. 5, for engaging the corners 28-34 at the intersection of the slots 24 and 26 for retaining the cover in place. The fingers, as can best be seen in FIG. 4, each comprise a stepped forward tapered point or tip that forms a gripping edge, as shown in 48, 50, 52, and 54 on fingers 40 through 46 of FIGS. 3 and 4. These gripping edges 48–54 engage the corners at the intersection of slots 24 and 26 for retaining the cover in position. With this arrangement, the cover may be inserted such that the fingers are aligned, as shown in FIGS. 3 and 4, with the respective slots and then rotated one-eighth of a turn and move to a position, as shown in FIGS. 2 and 5, for gripping the corners and retaining the cover in place over the closure assembly. The cover is removed in a simple reversal of the above process by simply rotating it one-eighth of a turn, such that the fingers release or clear the corners 28–34 and are positioned in the slots, as shown in FIG. 3. The cover can then be simply pulled out and away from the closure and removed.

Figure 6:
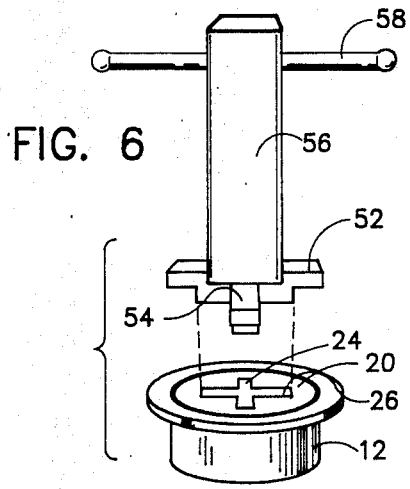
FIG. 6 is as perspective view showing a wrench for the cover.
Figure 7:
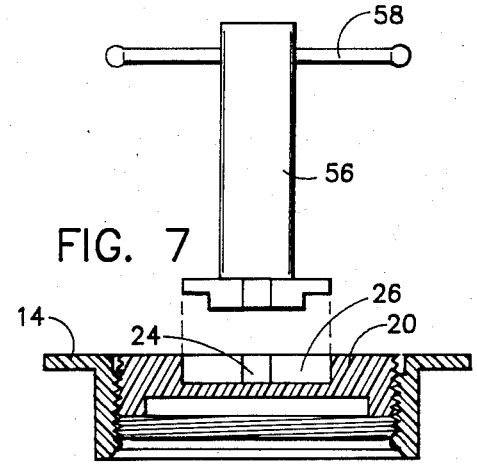
FIG. 7 is a partial sectional view showing the wrench and the cover.

The cross slot configuration provides a corresponding part of the retaining means for the cover. The cross slot also serves an additional function of a tool coupling, as can be seen in FIGS. 6 and 7, such that a wrench like tool designated generally by the numeral 56 can be utilized for tightening and loosening the closure plug 20. The tool comprises a crossbar arrangement of a pair of stepped crossbars 58 and 60, each having a stepped configuration forming a center forwardly projecting cross portion 62 and 64 thereof. The cross bars 58 and 60 are mounted on one end of a square tube 66 having a handle 68 slideably mounted in aligned bores in the opposite walls of the tube 66.

This provides a single tool for fitting multiple size plugs. The handle 68 can slide along its length to the end stops 70 to extend fully from one or the other sides of the tubular body member 66 or can be centered for providing the necessary leverage for rotation thereof.

As shown in FIG. 6, the plug 20 is of a fairly small diameter having slots 24 and 26 of a short length, for example on the order of about one to one and one-half inches in length. The stepped portions 62 and 64 of the crossbars 58 and 60 will extend into the cross slots, with the cut out portions of 58 and 60 resting on the top planar surface of the plug 20. This enables a sufficient coupling of the tool to the small plug to apply the necessary torque thereto.

Referring to FIG. 7, an alternate size relationship is shown wherein a larger plug, such as for example a three or four inch plug is shown wherein the cross slots 24 and 26 are of sufficient length to receive the full length of the cross members 58 and 60. Thus, the entire length of the cross members rest or extend into the slots 26 and 24 with the end of the tubular member 66 engaging and resting on the top planar surface of the plug 20.

The above combination of members and elements provide an improved plug and cover and wrench assembly that is easy to use and is simple and inexpensive to manufacture.

In operation, when the closure of the present assembly is utilized as a cleanout fitting, the end of a cleanout extension is cut flush with the surrounding support surface, such as a floor or wall and a sleeve 12 of the appropriate diameter is selected and bonded by means of a suitable bonding agent or the like within the internal diameter or the conduit, as shown in phantom in FIG. 2. The lip or rim 14 engages the end of the pipe and positions the sleeve relative to the end of the pipe or conduit as well as holds the sleeve in place during setting of the bonding agent. A plug 20 of the appropriate size is then selected and screwed into the inside of the sleeve with a wrench or tool 56 utilized as necessary for seating the plug 20, such that the upper planar surface thereof is essentially flush with the surrounding surface of the lip or rim 14. A cover 36 is then selected and placed over the plug and rotated, such that the fingers fall into the slots of the cross slot, as shown in FIG. 3, after which the cover is pushed into its fully flush position, such as shown in FIG. 2, and rotated one-eighth of a turn. This engages the spring gripping fingers with the corners of the slots for retaining the cover in place.

When it is desired to remove the plug, the cover is rotated one-eighth of a turn until the spring or gripping fingers release or clear the corners and extend into the slots, as shown in FIG. 3. The cover is then lifted off of the closure, and the plug may then be removed such as by means of a tool 56, as shown in FIGS. 6 and 7.

While I have illustrated and describe my invention by means of a specific embodiment, it is to be understood that numerous changes and modifications may be made therein within the spirit and scope of the invention as defined by the appended claims.

I claim:

1. A cover assembly for a closure comprising in combination:
   a closure having a generally circular cylindrical configuration with an axis, a generally flat planar top surface and a threaded generally cylindrical portion on the opposite side thereof from said top surface for threadably engaging and securing to the opening of a receptacle;
   a cross slot recess formed of slots having vertical walls intersecting at a right angle and forming corner edges parallel to said axis at the intersection of said slots in said top surface; and
   a flat planar cover for covering said closure, said cover having a releasable gripping means comprising a plurality of elastic fingers extending from a surface thereof in a circular array for selectively extending into said slots at a first rotary position of said closure and for selectively engaging and gripping the corner edges at a second rotary position for retaining said cover in position over said closure.

2. A cover assembly according to claim 1 wherein: said elastic fingers each have a step tapered forward end defining a gripping edge.

3. A cover assembly according to claim 2 wherein: said cover having a circular configuration and said fingers are disposed around the axis thereof.

4. A cover assembly according to claim 1 wherein: said slots are equal in length and depth.

5. A cover assembly according to claim 1 wherein: said gripping means comprises at least a pair of oppositely disposed fingers having a step tapered end defining a gripping edge for extending into said slots for releasing said cover at a first rotary position and engaging the corner edges at the intersection said slots for retaining said cover in position at a second rotary position.

6. A cover assembly according to claim 1 further comprising:
   a torque wrench having complementary cross bars for extending into said slots for applying torque to said closure for the application and for the removal thereof from said receptacle.

7. A cover assembly according to claim 1 wherein: said cover has a circular configuration and said fingers are disposed around the axis thereof.

8. A closure and cover assembly comprising in combiation:
- a closure having a generally circular cylindrical configuration with an axis, a generally flat planar top surface and a threaded generally cylindrical portion on the opposite side thereof from said top surface for threadably engaging and securing to the opening of a receptacle;
- a cross slot recess formed in said top surface of slots intersecting at a right angle forming corner edges parallel to said axis and having vertical walls;
- a circular flat planar cover for covering said closure said cover having releasable gripping means extending from a surface at the axis thereof for extending into said slot recess for releasably engaging and gripping said corner edges for retaining said cover in position over said closure; and
- said gripping means comprises a plurality of elastic fingers each having a step tapered forard end defining a gripping edge disposed in a circular array for selectively extending into said slots at a first rotary position and for selectively engaging the corner edges formed by the intersecting walls of said slots at a second rotary position.

9. A closure and cover assembly according to claim 8 wherein:
- said slots are equal in length and depth.

10. A closure and cover assembly comprising in combination:
- a closure having a generally circular cylindrical configuration with an axis, a generally flat planar top surface and a threaded generally cylindrical portion on the opposite side thereof from said top surface for threadably engaging and securing to the opening of a receptacle;
- a cross slot recess formed in said top surface of slots intersecting at a right angle forming corner edges parallel to said axis and having vertical walls;
- a circular flat planar cover for covering said closure, said cover having releasable gripping means extending from a surface at the axis thereof for extending into said slot recess for releasably engaging and gripping said corner edges for retaining said cover in position over said closure; and
- said gripping means comprises at least a pair of oppositely disposed fingers having a step tapered end defining a gripping edge for extending into said slots at a first rotary position for releasing said cover and for engaging the walls at the intersection of said slots at a second rotary position for retaining said cover in position.

11. A cover assembly according to claim 10 further comprising:
- a torque wrench having complementary cross bars for extending into said slots for applying torque to said closure for the application and for the removal thereof from said receptacle.

12. A closure and cover assembly according to claim 8 further comprising:
- a torque wrench having cross bars for engaging and extending into said slots for applying torque to said closure for the application and for the removal thereof from said receptacle.

13. A closure and cover assembly according to claim 1 wherein:
- said cross bars have a stepped construction providing a first portion for fitting a first size of cross slots and a forward extension extending forward from said first portion for fitting a second size of cross slots.

14. A closure and cover assembly comprising in combination:
- a cylindrical sleeve having an outer surface for engaging and bonding into a cylindrical opening in a receptacle and a threaded inner bore for receiving a threaded closure;
- a closure having a generally circular configuration with a generally flat planar top surface and a threaded cylindrical portion on the opposite side thereof from said top surface for threadably engaging and securing into the threaded bore of said sleeve for closing the opening of a receptacle;
- a cross slot recess formed of slots having vertical walls intersecting at a right angle forming corner edges parallel to the axis of said closure in the center of said top surface for receiving a tool for applying a torque thereto; and
- a circular flat planar cover for covering said closure said cover having releasable gripping means comprising a plurality of elastic fingers, each having a step tapered forward end defining a gripping edge disposed in a circular array extending from a surface at the axis thereof for extending into said slot recess at a first rotary position and for selectively engaging the corners formed by the intersecting walls of said slots at a second rotary position for releasably retaining said cover in position over said closure.

* * * * *

UNITED STATES PATENT AND TRADEMARK OFFICE
CERTIFICATE OF CORRECTION

PATENT NO. : 4,701,089
DATED : October 20, 1987
INVENTOR(S) : HANS NETTEL

It is certified that error appears in the above-identified patent and that said Letters Patent is hereby corrected as shown below:

Claim 13, line 2, delete "1" and insert therefor --12--.

Signed and Sealed this

First Day of March, 1988

Attest:

DONALD J. QUIGG

*Attesting Officer*  *Commissioner of Patents and Trademarks*